(No Model.)
D. B. MATLOCK.
FRUIT GATHERER.
No. 467,687. Patented Jan. 26, 1892.
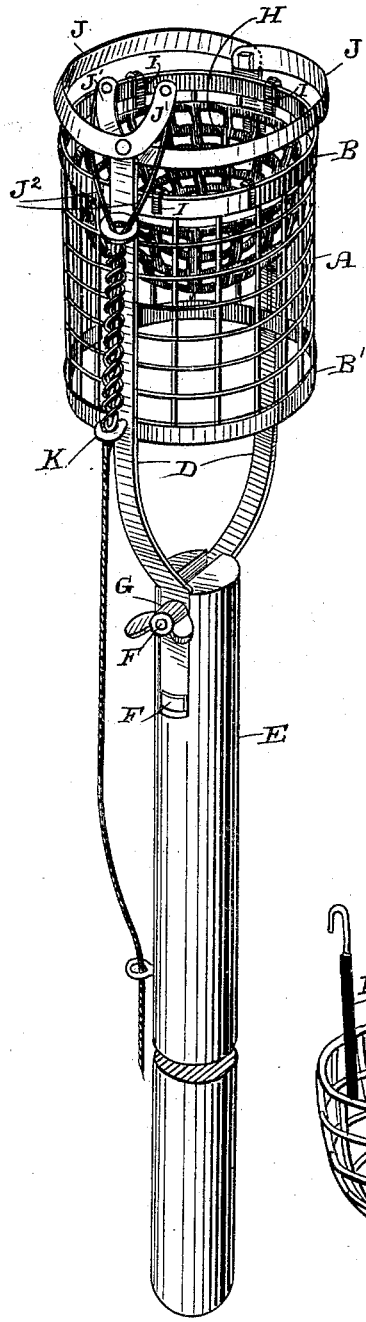
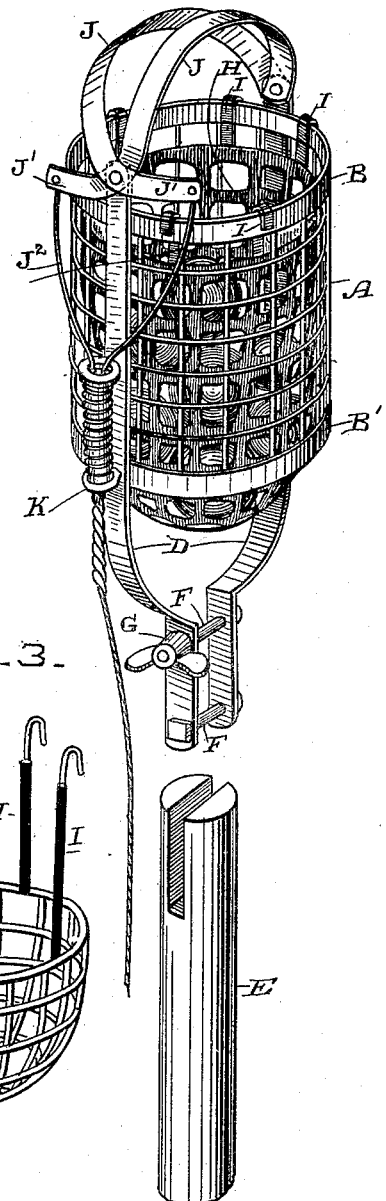
Witnesses:
Inventor,
David B. Matlock
By Dewey & Co.
attys

UNITED STATES PATENT OFFICE.

DAVID B. MATLOCK, OF SAN JOSÉ, CALIFORNIA.

FRUIT-GATHERER.

SPECIFICATION forming part of Letters Patent No. 467,687, dated January 26, 1892.

Application filed March 23, 1891. Serial No. 386,109. (No model.)

*To all whom it may concern:*

Be it known that I, DAVID B. MATLOCK, a citizen of the United States, residing at San José, Santa Clara county, State of California, have invented an Improvement in Fruit-Pickers; and I hereby declare the following to be a full, clear, and exact description of the same.

My invention relates to an improved device for gathering fruit of all descriptions from trees.

It consists of a case or receptacle supported above the end of a pole or standard and having a flexible self-adjusting bottom to receive the fruit and a device consisting of a semi-circular shears mounted above the top of the receptacle in such a manner that the stems of any fruit would be sheared off between the cutting-blades at any point around the circumference with a means for operating said blades together with certain details of construction which will be more fully explained by reference to the accompanying drawings, in which—

Figure 1 is a view of my device with the blades open and the flexible bottom near its highest point. Fig. 2 is a view showing the blades partly closed and the bottom depressed. Fig. 3 is a view of the flexible bottom, showing hangers of modified form.

A is the receptacle of my fruit-gatherer, which I prefer to make of an open net-work of wires or of flexible cords properly woven together so that the sides will present little or no obstruction to the view. Also the net-work provides means for fastening the flexible bottom higher or lower as desired. This enables the operator to accurately see the fruit and the stems when the device is held to a considerable height by means of a long pole and the fruit can thus be cut off from its stem and deposited in the receptacle without difficulty. This net-work is supported by means of the rigid rings B B' at the top and bottom, and around these rings the top and bottom of the side netting is suitably secured. These rings are suspended or fixed between the sides of an open yoke or fork D which extend up on each side and exterior to the receptacle. This fork extends downward to a considerable distance below the bottom of the receptacle and the lower ends are curved in toward each other and afterward extended down a short distance parallel and at a sufficient distance apart so that they may clasp the upper end of the pole E. A slot is made transversely through the upper end of this pole and the lower end of the yoke or fork has two pins F extending across it. The slot is of sufficient diameter to allow these pins to slip down into it and the ends of the pins outside of the yoke are screw-threaded and have thumb-nuts G fitted to turn upon these threads. When these thumb-nuts are loosened the sides of the yoke will spring apart sufficiently to allow it to be slipped easily upon the end of the pole, and when it is in proper position the thumb-nuts are turned up, thus compressing the sides of the yoke strongly against the upper end of the pole and securing it firmly in position. Either one or both of the pins may be provided with the thumb-nuts, as is found desirable.

Several poles of different lengths may be employed, and when all the fruit within reach of the shorter one has been gathered it is only necessary to loosen the thumb-nuts, remove the receptacle, and place it upon a longer pole.

The bottom of the receptacle is made of a soft flexible substance. In the present case I have shown it made of a flexible net-work for the purpose, as previously described, of making the receptacle as open as possible to allow the operator to see through it and see the exact position of the stems which are to be cut. This flexible bottom H is suspended from the sides of the receptacle by elastic hangers I, which are fixed at any suitable points either to the upper ring of the receptacle or to some points between that and the bottom, fastening it to the net-work at any desired point. The object of this is to make the bottom very elastic, so that when any heavy fruit which is liable to be bruised falls into it it will yield as the fruit strikes it. It also enables me to place the bottom very close to the top of the receptacle when the first fruit drops into it, so that it will not have far to fall, and as the weight of the fruit increases the elastic suspending devices will stretch, allowing the bottom to descend and thus increase the capacity of the receptacle. If desired, the bottom itself may be composed of elastic material. The distance through which this bottom is allowed to move will depend upon the elasticity of the suspending devices. It will be manifest that it may move over so great a distance as to increase the capacity of the receptacle to any desired degree, and the open yoke below allows the bottom to bulge or extend down below the sides without striking any rigid part to damage the fruit.

The means which I employ for gathering the fruit consists of a semicircular shears having the two blades J, the curvature of which is such that when opened these blades will approximately correspond with the periphery of the top of the receptacle. These blades are hinged together and to the upper ends of the yoke at opposite points, and one or both of them is provided with a cutting-edge. These two edges pass each other closely and act in all respects like the blades of a pair of shears, and differ in this respect from devices which merely pick or pull the fruit. It will be manifest that by reason of their being hinged together at their junction with the top of the receptacle they will commence crossing each other as soon as they are moved upward in the arc of a circle, and will continue to cross until they meet at the top. This construction is important, because when fruit grows with the stems projecting out to one side of limbs it will enable the operator to clip these stems off with the lower part or sides of the cutting edges and quite close to the hinges, whereas if the nipping or cutting could only be done with the upper ends of these devices it would necessitate the turning of the apparatus into awkward positions for the purpose of properly picking the fruit. It also greatly increases the leverage and the power to cut stems.

In order to operate these shears or cutters, I have shown the ends J' extended at one side beyond the hinges, so as to form levers to which rods or wires J² are connected. These rods or wires unite a short distance below, and thence extend down through suitable guides, as at K, and a cord or extension is led along down the pole until the lower end is within reach of the operator. By pulling upon this cord or wire the shears or cutters are closed to any degree and their edges serve to cut off the stems of the fruit and drop it into the receptacle. It will be manifest that these lever-arms might be made upon each end of the shears; but in practice I find that one set of arms is sufficient to operate the shears, the blades being made rigid enough for the purpose. This also leaves the opposite side of the shears entirely free, so that they may be used quite close to the hinge when the fruit is in such position that the sides of the shears only can be employed to cut off the stems. After the cord has been pulled and the shears closed they are again opened by means of a spring. This spring may be arranged in any suitable way. I have here shown a coil-spring surrounding the pulling wire or rod below the point where the two form a junction, and acting so that when the shears are closed the spring will be compressed or closed, and when released the expansion of the spring will act to open the jaws.

Various other spring connections may be employed for this purpose or the shears might be opened by gravitation, but I find the device which I have here shown to be positive and satisfactory in its action.

Having thus described my invention, what I claim as new, and desire to secure by Letters Patent, is—

1. In a fruit-gatherer, the combination, with a suitable receptacle, of a flexible bottom suspended from the receptacle by yielding connections, whereby the capacity of the receptacle is increased as the latter is filled from above, substantially as herein described.

2. In a fruit-gatherer, a receptacle consisting of the open net-work, a frame to which said net-work is fixed or suspended, and a flexible bottom with elastic suspending devices, whereby said bottom is suspended between the sides of the receptacle and is adjustable to increase the capacity of the receptacle as the latter is filled from above, substantially as herein described.

3. In a fruit-gatherer, a receptacle having the open or net-work sides, the elastically-suspended adjustable bottom movable within and attached to these sides, an exterior frame extending up on each side to which the receptacle is fixed or suspended, said frame forming a yoke or loop which extends below the bottom of the receptacle, so as to leave an open space, and means whereby said frame is removably attached to the end of a pole, substantially as herein described.

4. In a fruit-gatherer, the receptacle, the yoke or frame within which it is supported, the lower ends of said yoke being curved toward each other and then made parallel for a short distance, screw-threaded pins extending through the parallel sides of the lower end of the yoke and having thumb-nuts upon their outer projecting ends by which the sides of the yoke may be forced toward each other, and a pole having a slot made in the upper end into which the pins are allowed to slide when the thumb-nuts are loosened and upon which the yoke may be fixed by screwing up the nut, substantially as herein described.

5. In a fruit-gatherer, a receptacle, a frame or yoke within which it is suspended and by which it is removably attached to the upper end of a pole, a bottom for the receptacle suspended from the same by elastic connections, whereby the capacity of the receptacle is increased as the latter is filled from above, semicircular shears having cutting-blades pivoted or fulcrumed together at opposite points above the receptacle, lever-arms projecting beyond the fulcrum-point at one side, and wires or rods connected with said arms and uniting and extending downward through guides and connected with a cord which extends down the side of the pole, substantially as herein described.

6. In a fruit-gatherer, a receptacle fixed or suspended between the sides of a yoke, a bottom for the receptacle suspended from the same by elastic connections, semicircular shears fulcrumed upon opposite sides to the upper end of said yoke, having the projecting lever-arms, connecting wires or rods, and cord by which the shears are closed, in combination with a spring whereby the blades of the shears are opened when the pull upon the cord is released, substantially as herein described.

In witness whereof I have hereunto set my hand.

DAVID B. MATLOCK.

Witnesses:
S. H. NOURSE,
J. A. BAYLESS.